United States Patent [19]
Fujii et al.

[11] Patent Number: 6,078,715
[45] Date of Patent: Jun. 20, 2000

[54] OPTICAL FIBER

[75] Inventors: Takashi Fujii; Yasuo Matsuda, both of Yokohama; Kazuki Sogabe; Takayuki Mishima, both of Osaka, all of Japan

[73] Assignee: Sumitomo Electric Industries, Ltd., Osaka, Japan

[21] Appl. No.: 09/096,743

[22] Filed: Jun. 12, 1998

[30] Foreign Application Priority Data

Jun. 13, 1997 [JP] Japan ..................... 8-157030

[51] Int. Cl.$^7$ .................................. G02B 6/02
[52] U.S. Cl. .................. 385/124; 385/123; 385/125; 385/126; 385/127
[58] Field of Search .................. 385/124, 123, 385/125, 126, 128, 127; 428/34.6

[56] References Cited

U.S. PATENT DOCUMENTS

| | | | |
|---|---|---|---|
| 5,717,809 | 2/1998 | Brehm et al. | 385/128 |
| 5,790,735 | 8/1998 | Oleskeich et al. | 385/127 |
| 5,841,926 | 11/1998 | Takeuchi et al. | 385/123 |
| 5,942,296 | 8/1999 | Oh et al. | 428/34.6 |

FOREIGN PATENT DOCUMENTS

| | | |
|---|---|---|
| 0689068A1 | 12/1995 | European Pat. Off. . |
| 3804152A1 | 8/1989 | Germany . |
| 3-18161 | 3/1991 | Japan . |
| 3-245108 | 10/1991 | Japan . |
| 07218734 | 8/1995 | Japan . |
| 1475478 | 6/1977 | United Kingdom . |
| 2185331 | 7/1987 | United Kingdom . |

*Primary Examiner*—Cassandra Spyrou
*Assistant Examiner*—Mohammad Y. Sikder
*Attorney, Agent, or Firm*—Pillsbury Madison & Sutro LLP

[57] ABSTRACT

This invention concerns a large-diameter optical fiber that is improved in the bandwidth and bending loss and that can be produced at low cost with higher productivity. The optical fiber comprises an inner core having a refractive index profile in which refractive indices increase toward the center axis thereof, an outer core provided outside the inner core and having a constant refractive index not more than the minimum refractive index of the inner core, and a cladding provided outside the outer core and containing a plastic material having a refractive index lower than that of the outer core. In the optical fiber, total refractive index difference ($\Delta n_{total}$), defined as the difference between the maximum refractive index of the inner core and the refractive index of the cladding, is not less than 0.015 and not more than 0.1; and a outside core diameter of the outer core ($d_1$) is not less than 100 $\mu$m and not more than 500 $\mu$m.

5 Claims, 7 Drawing Sheets

OPTICAL FIBER

BACKGROUND OF THE INVENTION

1. Field of the Invention

The present invention relates to an optical fiber and, more particularly, to a large-diameter optical fiber having the core diameter of not less than 100 μm.

2. Related Background Art

There are a variety of causes of optical loss in an optical fiber. Typical causes of the optical loss in the optical fiber are bending, and modal dispersion in the case of large-diameter optical fibers having the core diameter of not less than 100 μm. It is thus important to reduce these losses.

Incidentally, an example of the optical fiber is disclosed in Japanese Laid-open Patent Application No. 7-218734. This optical fiber has a core made of silica or optical glass, and a cladding made of a cured resin composition.

Another example of the optical fiber is disclosed in Japanese Laid-open Patent Application No. 3-245108. As shown in FIG. 7, this optical fiber 100 has a core 101, which contains a glass base material and in which a refractive index profile of a parabolic profile type is formed across the whole core diameter, and a cladding 102, which is made of a plastic material having a constant index of refraction smaller than those of the core 101. The refractive index profile of the core 101 is established by a concentration distribution of a dopant, such as Ge, added into the core 101. The refractive index of the cladding 102 is not less than 0.97 and not more than 0.985 times that of the outer peripheral portion of the core 101, and a difference is made in the refractive index at the border between the core 101 and the cladding 102, thereby attaining a high numerical aperture (NA).

Further, Japanese Patent Publication No. Hei 3-18161 discloses the optical fiber having a center core, a low index core disposed outside thereof and having a smaller refractive index than that of the center core, and a cladding region disposed further outside thereof. This optical fiber has zero dispersion in the 1.5 μm band and is thus a single-mode optical fiber therein. Further, the relative index difference thereof is more than 0.004 but not more than 0.014.

SUMMARY OF THE INVENTION

Having studied the above-mentioned conventional optical fibers, the inventors have found the following problems.

Namely, since the optical fiber disclosed in Japanese Laid-open Patent Application No. 7-218734 has the core made of one kind of material and having the constant refractive index, the optical fiber, if having a large diameter causes the modal dispersion, so that a transmitted signal band becomes narrow.

Also, since in the optical fiber 100 disclosed in Japanese Laid-open Patent Application No. 3-245108 the index profile of the parabolic profile type is formed across the whole core diameter, if the core diameter of the optical fiber 100 is not less than 100 μm, an amount of the dopant added is large, so as to increase the production cost. Since the dopant in glass is distributed across the whole core diameter upon synthesis of the core 101, it is hard to precisely control the distribution of the dopant if the core diameter of the optical fiber is large, and thus productivity of optical fiber cannot be improved well.

Further, the optical fiber disclosed in Japanese Patent Publication No. Hei 3-18161 is the single-mode optical fiber and has considerably small relative index difference. Therefore, this optical fiber has the low numerical aperture (NA), and the loss due to bending thus increases.

It is an object of the present invention to provide a large-diameter optical fiber having a wide bandwidth and a small bending loss and being produced at low cost with high productivity.

An optical fiber of the present invention comprises an inner core having a refractive index profile in which refractive indices increase toward the center axis thereof, an outer core provided outside of the inner core and having a constant refractive index not more than the minimum refractive index of the inner core, and a cladding provided outside of the outer core and containing a plastic material having a smaller refractive index than that of the outer core, wherein total refractive index difference ($\Delta n_{total}$), defined as the difference between the maximum refractive index of the inner core and the refractive index of the cladding, is not less than 0.015 and not more than 0.1; and a outside core diameter of the outer core ($d_1$) is not less than 100 μm and not more than 500 μm.

Thus, the optical fiber of the present invention has the refractive index profile with increasing refractive indices toward the center axis only in the inner core, which has a smaller diameter than that of the outer core. In comparison to optical fibers having the above refractive index profile across the whole core diameter, it is easier to precisely control the index profile and obtain the desired refractive index profile in optical fibers of the present invention having an outer core with a large diameter. Also, since the cladding of the optical fiber of the present invention contains the plastic material, it becomes possible to set the total refractive index difference ($\Delta n_{total}$) larger than that of the optical fiber where the cladding contains a glass material. Further, when the value of $\Delta n_{total}$ is less than 0.015, the bending loss increases; when the value of $\Delta n_{total}$ is over 0.1, fabrication of the optical fiber becomes difficult and its cost increases. When the outside core diameter of the outer core ($d_1$) is less than 100 μm, it is necessary to use a precise and expensive optical connector for coupling with this optical fiber; when the outside core diameter of the outer core ($d_1$) is over 500 μm, the volume of the fiber increases, so as to increase the production cost and the stiffness of the optical fiber. Thus handing of the fiber becomes difficult.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
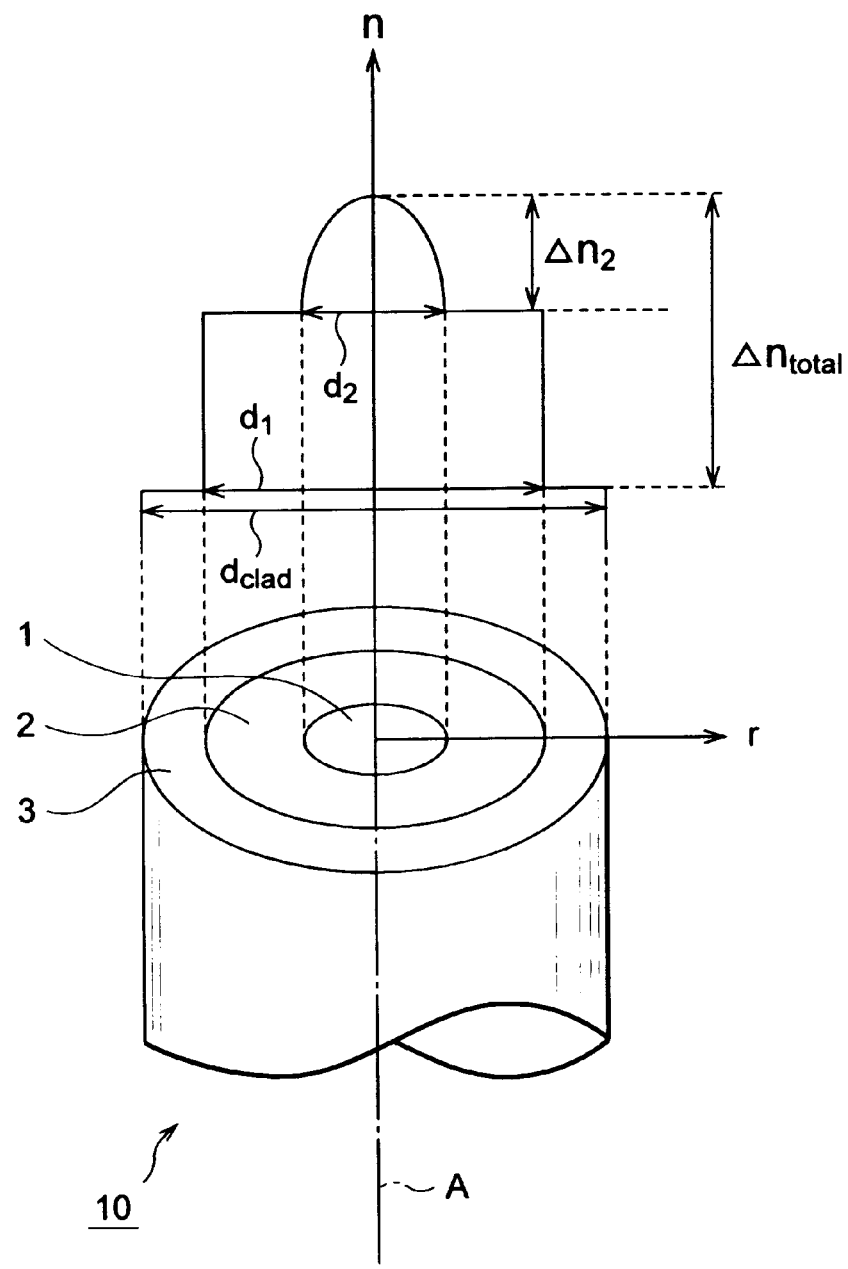
FIG. 1 is a drawing to show an embodiment of the optical fiber of the present invention and a refractive index profile along the diameter in correspondence to this optical fiber.
Figure 2:
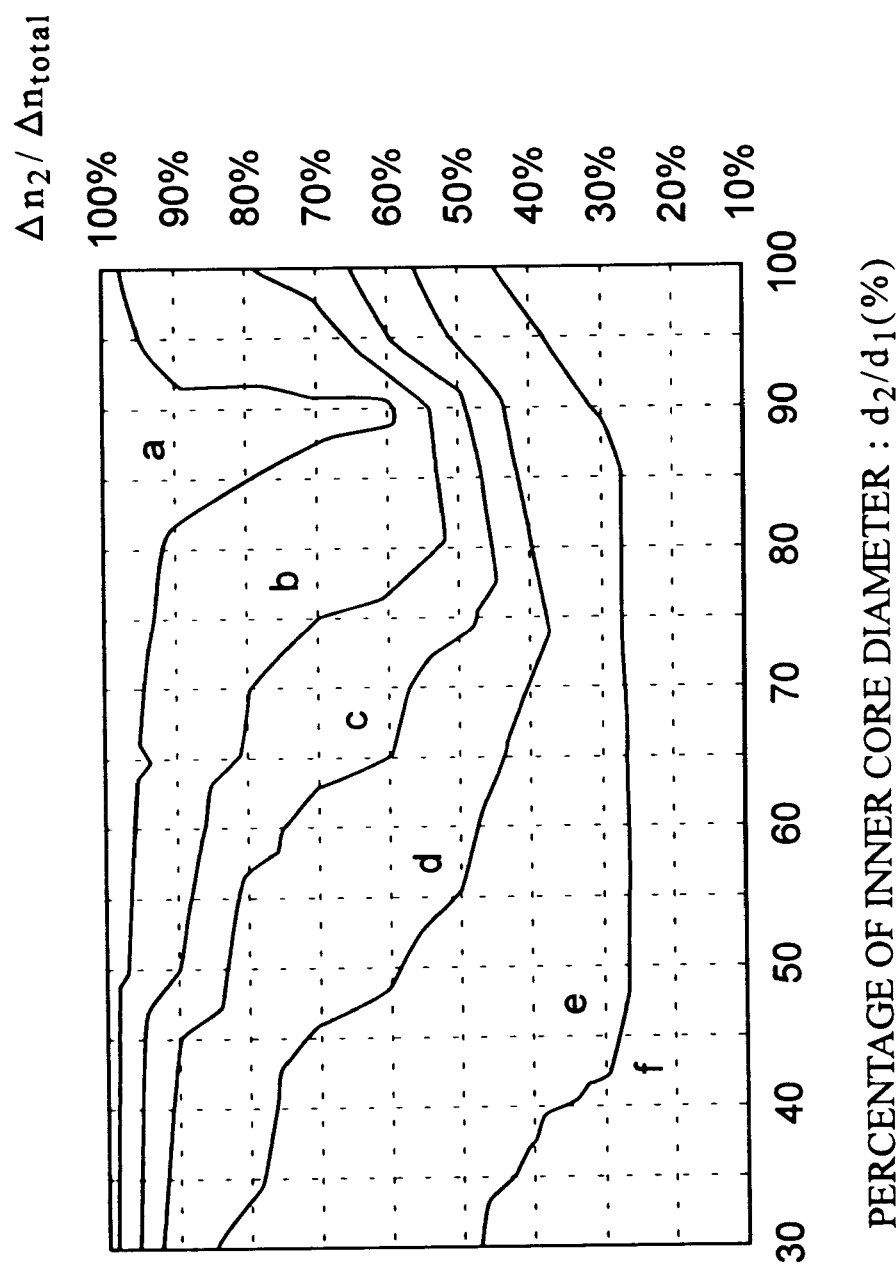
FIG. 2 is a graph to show the relation among ratios of the diameter of the inner core to the diameter of the outer core ($d_2/d_1$), ($\Delta_2/\Delta n_{total}$), and bandwidths.

The preferred embodiments of the optical fiber according to the present invention will be described in detail by reference to FIG. 1 to FIG. 3. FIG. 1 is a drawing to show the relation between an optical fiber of the present invention and the refractive index profile along the diameter corresponding to this optical fiber.

As shown in FIG. 1, the optical fiber 10 has an inner core 1, an outer core 2 provided outside of this inner core 1 and having a constant refractive index not more than the minimum refractive index of the inner core 1, and a cladding 3 provided outside of the outer core 2 and having a constant refractive index smaller than that of the outer core 2.

The inner core 1 contains a material that can sufficiently decrease the loss of light propagating inside thereof, for example silica glass. The inner core 1 contains a dopant for increasing the refractive index, added in the silica glass. Examples of the dopant are Ge, Ti, P, B, F, Al, and so on. Concentrations of the dopant continuously increase with nearing the center axis A of the inner core 1. Therefore, the refractive indices increase toward the center axis A. This refractive index profile is, for example, a refractive index profile of the αth power profile type. Namely, the refractive indices are proportional to the αth power of distance along the diameter from the center axis A. Reasons why the refractive index profile of the αth power profile type is employed are to decrease the effect of the modal dispersion in the optical fiber 10 and to broaden the bandwidth.

Values for α are preferably 1.5–5. If the value of α is off the above range, there will appear such tendencies that it becomes harder to produce the desired refractive index profile and that, even if the refractive index profile is produced, the core becomes more fragile and the bandwidth of the optical fiber 10 becomes narrower. It is noted that α does not have to be constant as long as the refractive index profile has the refractive indices increasing toward the center axis A. Namely, α may take different values between in a portion near the center axis A and in a portion apart therefrom.

The maximum refractive index of the inner core 1 is preferably 1.450–1.500. In this case, a doping amount of the dopant is 1–20 wt % per silica glass 100 wt %. The core diameter of the inner core 1 ($d_2$) is preferably 150–300 μm.

The outer core 2 is preferably made of a material that can sufficiently decrease the loss of light passing inside thereof, similar to the inner core 1. The refractive index of the outer core 2 is preferably 1.400–1.480. A typical example of the material for making this outer core 2 is silica glass. The outside core diameter of the outer core 2 ($d_1$) is 100–500 μm. When $d_1$ is less than 100 μm, high molding accuracy is required for production of a connector for this optical fiber, which increases the production cost. When $d_1$ is over 500 μm, the fiber volume increases, so as to increase the production cost and the stiffness of the optical fiber 10, thus making handling thereof difficult. In addition, the doping amount of the dopant needs to be increased, which increases the production cost. For fabrication of the core portion comprised of an outer core portion that will become the outer core 2 and an inner core portion that will become the inner core 1, the inner core portion and the outer core portion are preferably fabricated together in terms of decreasing the optical return loss in the border portion between the inner core 1 and the outer core 2.

The ratio ($d_2/d_1$) of the core diameter of the inner core 1 ($d_2$) to the outside core diameter of the outer core 2 ($d_1$) is preferably 0.3–0.95 and more preferably 0.5–0.9. When the ratio ($d_2/d_1$) is less than 0.3, the percentage of the core diameter of the inner core 1 ($d_2$) tends to become smaller over the core diameter of the outer core 2 ($d_1$), so that the area of the refractive index profile of the αth power profile type becomes narrower. This narrows the bandwidth. When the ratio ($d_2/d_1$) is over 0.95, the percentage of the core diameter of the inner core 1 ($d_2$) tends to become larger over the outside core diameter of the outer core 2 ($d_1$), so as to increase the doping amount of the dopant, which thus increases the production cost.

The cladding 3 contains a plastic material in order to make a difference in the refractive index between the outer core 2 and the cladding 3, so as to increase NA of the optical fiber 10. In this case, therefore, the optical coupling efficiency increases between the optical fiber 10 and a light source (not illustrated) and the bending loss of the optical fiber 10 decreases. The plastic material is selected, for example, from cyclic perfluororesin, photo-curing acrylic fluoride resin, and so on, and preferably, from the photo-curing acrylic fluoride resin in terms of improvement in productivity. A photopolymerization initiator, and a coupling agent for forming chemical bonds with glass are added to the photo-curing acrylic fluoride resin. The photopolymerization initiator is selected, for example, from benzophenone, acetophenone, benzyl benzoin, benzoyl peroxide, α,α'-azobisisobutyronitrile, 2-hydroxy-2-methyl-1-phenylpropan-1-one, and so on. The coupling agent is selected, for example, from trimethoxyvinylsilane, methacryloxypropyltrimethoxysilane, dimethylethoxyvinylsilane, and so on. The refractive index of the cladding 3 is preferably 1.30–1.45. The outside diameter of the cladding 3 is preferably 170–350 μm.

The ratio ($d_1/d_{clad}$) of the outside core diameter of the outer core 2 ($d_1$) to the outside diameter of the above cladding 3 ($d_{clad}$) is preferably 0.8–0.95. When the ratio ($d_1/d_{clad}$) is less than 0.8, the optical coupling efficiency decreases between the optical fiber 10 and another optical fiber or a light source to be coupled therewith. When the ratio ($d_1/d_{clad}$) is over 0.95, the percentage of the cladding 3 containing the plastic material becomes smaller, so that the optical fiber 10 tends to become harder to bend.

The total refractive index difference (hereinafter referred to as $\Delta n_{total}$), defined as the difference between the maximum refractive index of the inner core 1 and the refractive index of the cladding 3 is 0.015–0.1. When $\Delta n_{total}$ is less than 0.015, the bending loss increases and the problem of eye-safety occurs. When $\Delta n_{total}$ is over 0.1, fabrication of the optical fiber 10 becomes difficult and costs high, and the transmission characteristics (particularly the bandwidth) degrade.

The ratio ($\Delta n_2/\Delta n_{total}$) is preferably 0.2–0.9 and more preferably 0.5–0.85, $\Delta n_2$ being defined as the difference between the maximum refractive index and the minimum refractive index in the inner core 1. When ($\Delta n_2/\Delta n_{total}$) is less than 0.2, the area of the index profile of the αth power profile type becomes narrower and thus there is a tendency that the bandwidth cannot be widened. When ($\Delta n_2/\Delta n_{total}$) is over 0.9, in the case where the inner core 1 is made by addition of a fixed amount of the dopant, the difference in the refractive index of the cladding 3 and the outer core 2 is small, so that the effective NA decreases and the bending loss increases; in the case where the doping amount of the dopant is increased in order to increase $\Delta n_2$ (or the maximum refractive index of the inner core 1), the core portion that will become the inner core 1 and outer core 2 tends to become more fragile.

Next described is an example of a method for fabricating the optical fiber 10 having the above structure.

First, the core portion to become the inner core 1 and outer core 2 of the optical fiber 10 is produced in the following manner, using the VAD process. Specifically, a glass rod of silica is first prepared. Then this glass rod is kept standing vertically. Then flame is ejected from a burner for the inner core to the central part at the bottom end of the glass rod and from a burner for the outer core to the peripheral part. The temperatures of the bottom end of the glass rod are 600–800° C. in the central part and 300–600° C. in the peripheral part. In this case, $SiCl_4$ gas, $GeCl_4$ gas, hydrogen gas, and oxygen gas are simultaneously fed to the inner core burner and $SiCl_4$ gas, hydrogen gas, and oxygen gas are simultaneously fed to the outer core burner. As a result, silica particles are deposited on the central part at the bottom end of the glass rod and germanium is taken in this central part. The nearer to the center axis A, the larger concentrations of germanium; the farther from the center axis A, the smaller the concentrations of germanium.

At this time, the glass rod is pulled up with being rotated so that the position of the bottom surface is always constant. At the bottom end of the glass rod a porous glass deposit is formed by heating with the burners. This glass deposit is sintered through a carbon heater of a ring shape while being pulled up, thus obtaining the core portion comprised of the inner core portion expected to be the inner core 1 and the outer core portion expected to be the outer core 2.

Then the core portion thus obtained is set in a cylindrical drawing furnace and then drawing is conducted with heating the bottom end of the core portion, thus forming the core consisting of the inner core 1 and the outer core 2. Then this core is allowed to pass through a die charged with the material for formation of the cladding containing the photo-curing acrylic fluoride resin as the plastic material, the photopolymerization initiator, and the coupling agent, thereby coating the outside of the core with the clad-forming material. Then this clad-forming material is exposed to ultraviolet rays, so as to cure the clad-forming material, thereby obtaining the optical fiber 10 having the outside diameter of 100–500 μm.

The aforementioned optical fiber 10 has the refractive index profile with increasing refractive indices toward the center axis A only in the inner core 1, which has the smaller diameter than that of the outer core 2. Accordingly, in comparison to optical fibers having the above refractive index profile across the whole core diameter, the doping amount of the expensive dopant such as Ge can be smaller in this structure in optical fiber 10 having outer core 2 with a large diameter. The production cost of the optical fiber 10 can be decreased accordingly. It also becomes easier to precisely control the dopant concentration distribution, so that the refractive index profile in the inner core 1 can be accurately controlled in the ideal αth power profile type. This results in improving the productivity of optical fiber 10. Also, since the cladding 3 contains the plastic material, the total refractive index difference ($\Delta n_{total}$) can be larger than in the case where the cladding 3 contains the glass material, and thus NA of the optical fiber 10 can be greater. Therefore, the optical fiber 10 can increase the optical coupling efficiency between the optical fiber 10 and the light source and can sufficiently decrease the bending loss of the optical fiber 10.

Further, the optical fiber 10 can be formed with the bandwidth of 500 MHz·100 m or more at either wavelength in the range between 570 nm inclusive and 850 nm inclusive by adjusting the ratio ($d_2/d_1$) of the core diameter of the inner core 1 ($d_2$) to the core diameter of the outer core 2 ($d_1$), and ($\Delta n_2/\Delta n_{total}$). For example, at the wavelength of 650 nm, as shown in FIG. 2, the bandwidth of 500–3000 MHz can be attained with the optical fiber 10 by suitably adjusting the ratio ($d_2/d_1$) and ($\Delta n_2/\Delta n_{total}$). In FIG. 2, "a" represents an area of the bandwidth 2500–3000 (MHz·100 m), "b" an area of the bandwidth 2000–2500 (MH·100 m), "c" an area of the bandwidth 1500–2000 (MHz·100 m), "d" an area of the bandwidth 1000–1500 (MH·100 m), "e" an area of the bandwidth 500–1000 (MHz·100 m), and "f" an area of the bandwidth 0–500 (MH·100 m).

It is noted that the present invention is by no means limited to the embodiment described above. For example, the inner core 1 and outer core 2 may contain a plastic material, in the optical fiber 10. The optical fiber 10 may be made in the structure wherein the inner core 1 contains the silica glass while the outer core 2 contains the plastic material; or, conversely, in the structure wherein the inner core 1 contains the plastic material while the outer core 2 contains the silica glass.

In the above production of the optical fiber 10 the core portion that will become the outer core 2 and the inner core 1 is made together using the VAD process, but the core portion may be formed in two steps by a method of forming the inner core portion by the VAD process, thereafter inserting the inner core portion into a hollow outer core portion made separately from the inner core portion, and collapsing the outer core portion.

Figure 3:
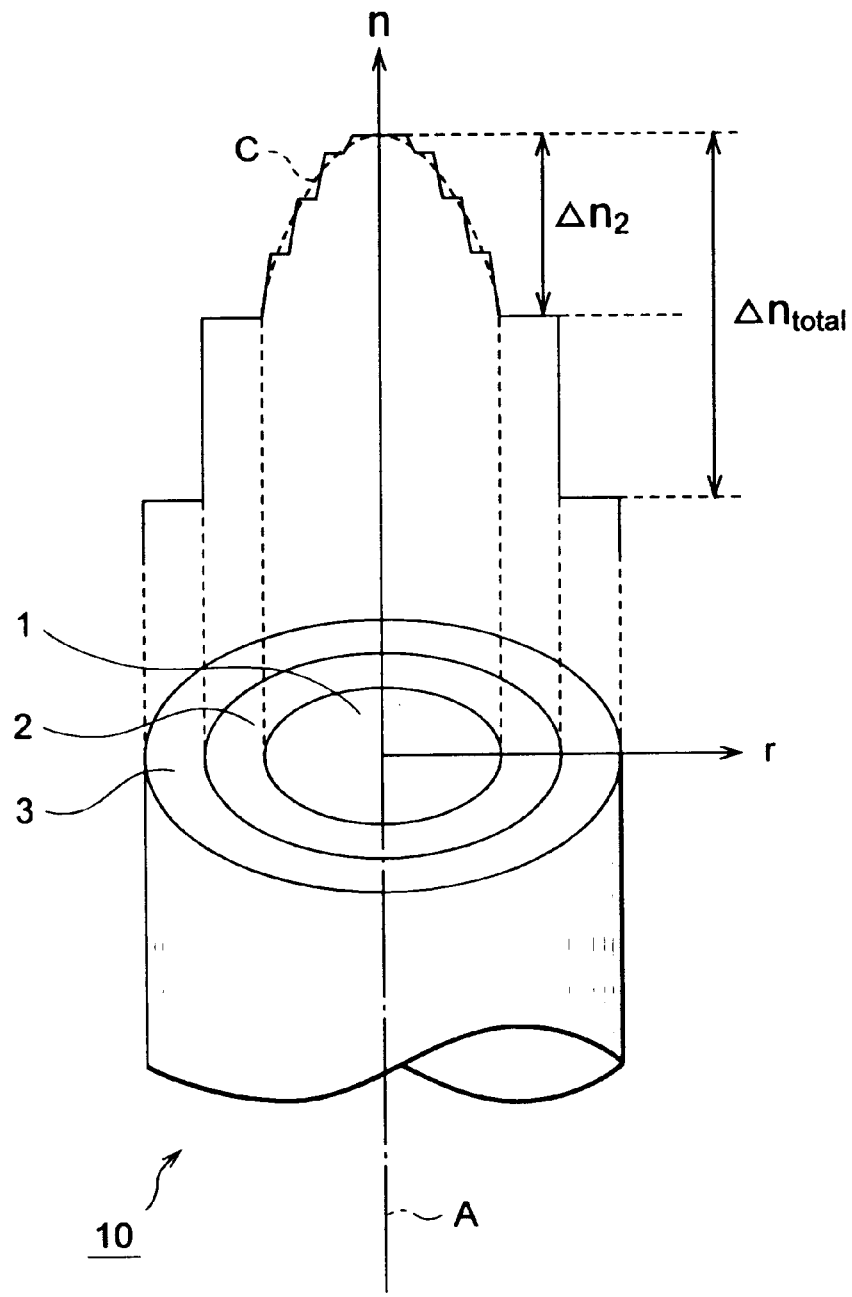
FIG. 3 is a drawing to show another embodiment of the present invention and a refractive index profile along the diameter in correspondence to this optical fiber.

In the above embodiment the refractive index profile in the inner core 1 smoothly changes toward the center axis, but the profile may also change stepwise along a second power (parabolic) profile curve C indicated by a dashed line, as shown in FIG. 3. In this case the second power profile curve C passes middle points of respective steps.

The present invention will be described more specifically with examples, but it should be noted that the present invention is not intended to be limited thereby.

EXAMPLES (Example 1)

Prepared was the core with the inner core 1 and outer core 2 made of the base material of silica glass having the refractive index of 1.458 wherein Ge (additive amount: 8.2 wt %) was added per $SiO_2$ 100 wt % in the inner core 1. The core having the outside diameter of 200 μm was obtained by first preparing the core portion to become the core by the VAD process and then drawing the core portion. Further, the outside of the core was coated with the material for forming the cladding as follows. This clad-forming material was a mixture of compounds represented by the following chemical formulas (1)–(4):

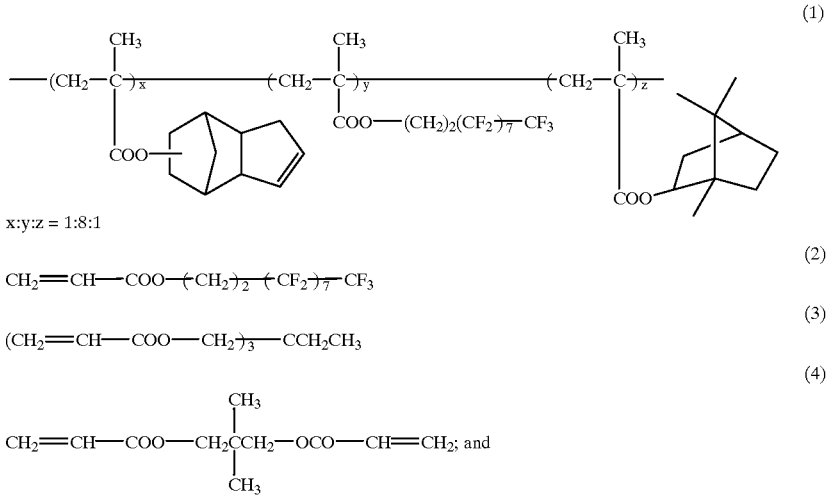

and the photopolymerization initiator (2-hydroxy-2-methyl-1-phenylpropan-1-one) and the coupling agent (dimethylethoxyvinylsilane) (5);

wherein the mixture (the refractive index 1.423) had the following composition (weight ratio):

(1):(2):(3):(4):(5)=10:52:15:18:5.

Figure 4:
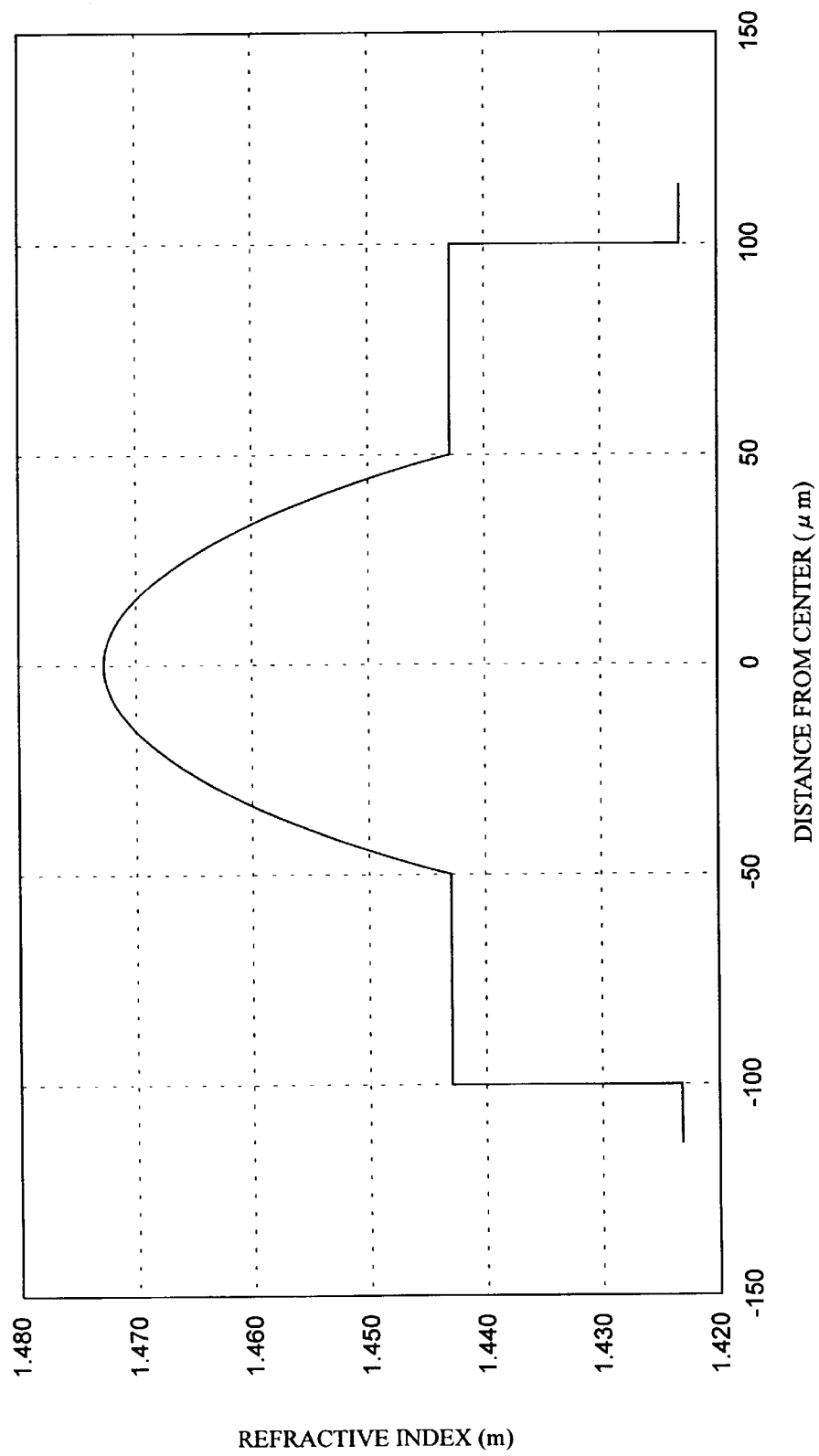
FIG. 4 is a schematic diagram to show the refractive index profile in the optical fiber of Example 1.

The optical fiber was produced in this way. For this optical fiber, the refractive index profile was measured using a preform analyzer (P104 refractive index profile measuring apparatus available from Seiko Denshi Kogyo). The result was shown in FIG. 4. This optical fiber was evaluated as to the transmission bandwidth and the loss due to bending of the optical fiber. The results were shown in Table 1.

Figure 5:
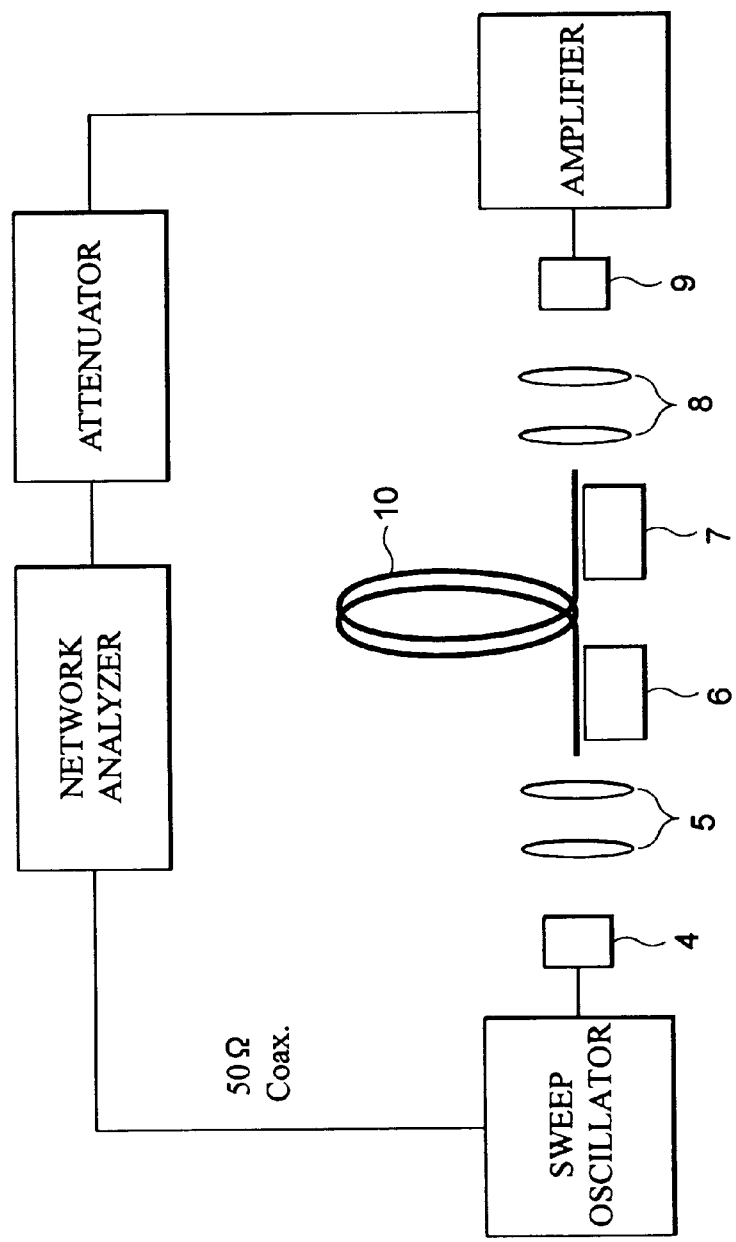
FIG. 5 is a schematic diagram to show a system for measuring a transmission bandwidth of optical fiber.

The transmission bandwidths were measured by the frequency sweep method using the apparatus shown in FIG. 5. In FIG. 5, numeral 4 designates LD (NA=0.3) of the wavelength 650 nm, 5, 8 lenses, 6, 7 XYZ stage, and 9 APD (the diameter of the light receiving surface thereof is 0.2 mm).

Figure 6:
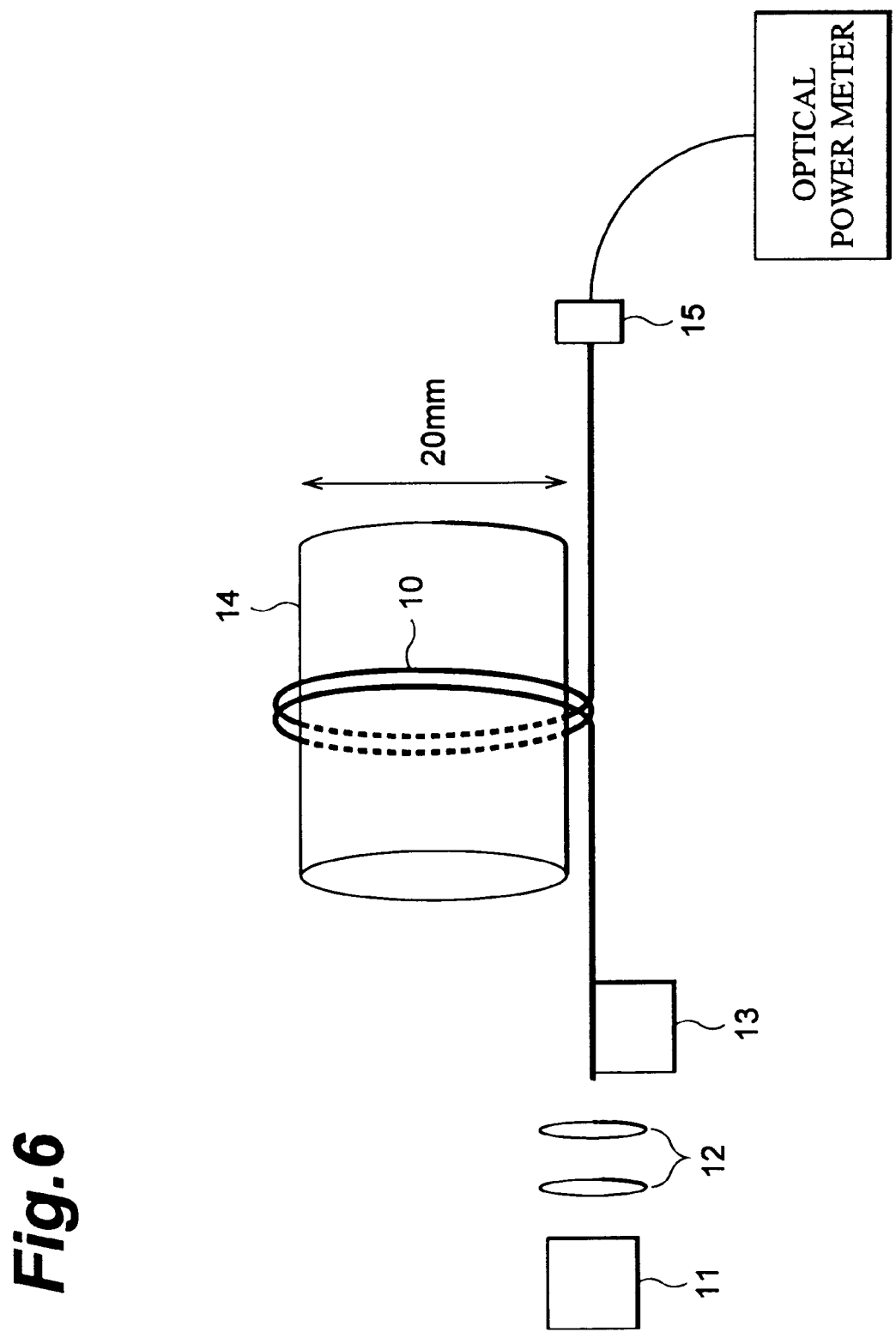
FIG. 6 is a schematic diagram to show a system for measuring a bending loss of optical fiber.
Figure 7:
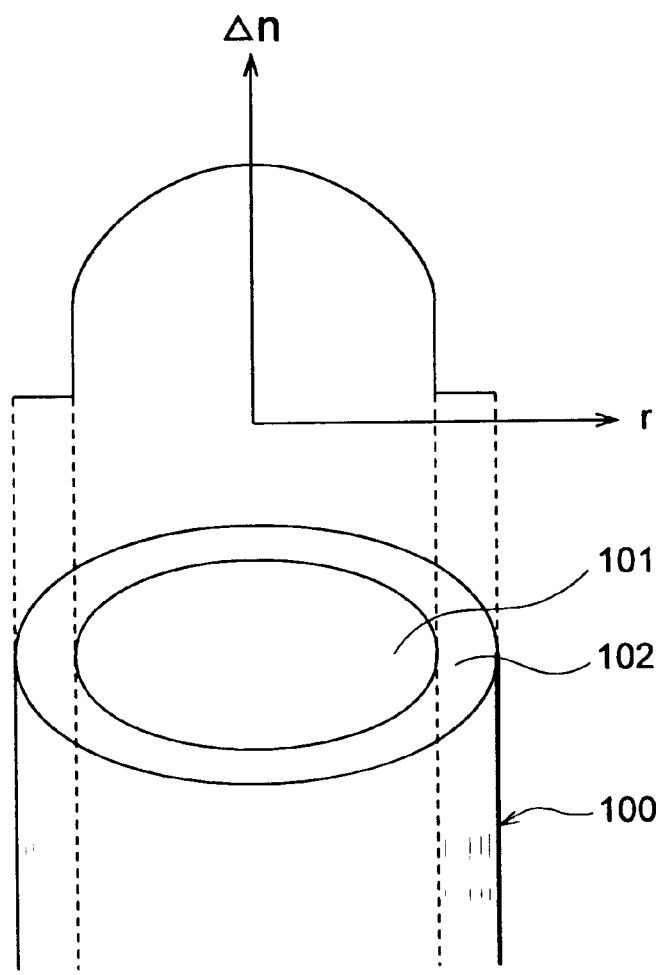
FIG. 7 is a drawing to show the conventional optical fiber and the refractive index profile along the diameter in correspondence to this optical fiber.

The bending losses were measured using the apparatus shown in FIG. 6. In FIG. 6, numeral 11 designates LD of the wavelength 650 nm, 12 lenses, 13 XYZ stage, 14 a mandrel of the diameter 20 mm, and 15 a sensor adapter. For the measurement, ten windings of the optical fiber 10 were made around the mandrel 14.

(Example 2)

An optical fiber was produced in the same manner as in Example 1 except that the core diameter of the inner core 1

TABLE 1

| | $d_1$ ($\mu$m) | $d_2$ ($\mu$m) | $d_{clad}$ ($\mu$m) | $d_2/d_1$ | $d_1/d_{clad}$ | DOPING AMOUNT OF Ge (wt %) | $\Delta n_2$ | $\Delta n_{total}$ | $\Delta n_2/\Delta n_{total}$ | $n_{clad}$ | $\alpha$ (POWER) | BANDWIDTH (GH$_z$ · 100 m) | BENDING LOSS |
|---|---|---|---|---|---|---|---|---|---|---|---|---|---|
| EXAMPLE 1 | 200 | 100 | 230 | 0.5 | 0.87 | 8.2 | 0.03 | 0.05 | 0.6 | 1.423 | 2 | 1.2 | 2 |
| EXAMPLE 2 | 200 | 50 | 230 | 0.25 | 0.87 | 3.4 | 0.03 | 0.05 | 0.6 | 1.423 | 2 | 0.7 | 2 |
| EXAMPLE 3 | 200 | 80 | 230 | 0.4 | 0.87 | 6.6 | 0.03 | 0.05 | 0.6 | 1.423 | 2 | 0.8 | 2 |
| EXAMPLE 4 | 200 | 180 | 230 | 0.9 | 0.87 | 14.8 | 0.03 | 0.05 | 0.6 | 1.423 | 2 | >2 | 2 |
| EXAMPLE 5 | 200 | 100 | 230 | 0.5 | 0.87 | 2.7 | 0.01 | 0.05 | 0.2 | 1.418 | 2 | 0.7 | 2 |
| EXAMPLE 6 | 200 | 100 | 230 | 0.5 | 0.87 | 21.9 | 0.04 | 0.05 | 0.8 | 1.438 | 2 | 1.4 | 2 |
| EXAMPLE 7 | 200 | 100 | 230 | 0.5 | 0.87 | 4.4 | 0.016 | 0.08 | 0.2 | 1.394 | 2 | 0.5 | 1 |
| EXAMPLE 8 | 200 | 100 | 230 | 0.5 | 0.87 | 7.4 | 0.03 | 0.05 | 0.6 | 1.423 | 1.5 | 0.9 | 2 |
| EXAMPLE 9 | 200 | 100 | 230 | 0.5 | 0.87 | 9.2 | 0.03 | 0.05 | 0.6 | 1.423 | 3 | 0.9 | 2 |
| EXAMPLE 10 | 200 | 100 | 230 | 0.5 | 0.87 | 10.2 | 0.03 | 0.05 | 0.6 | 1.423 | 5 | 0.7 | 2 |
| EXAMPLE 11 | 200 | 100 | 210 | 0.5 | 0.95 | 8.2 | 0.03 | 0.05 | 0.6 | 1.423 | 2 | 1.2 | 2 |
| EXAMPLE 12 | 200 | 100 | 300 | 0.5 | 0.67 | 8.2 | 0.03 | 0.05 | 0.6 | 1.423 | 2 | 1.2 | 2 |
| EXAMPLE 13 | 100 | 50 | 115 | 0.5 | 0.87 | 8.2 | 0.03 | 0.05 | 0.6 | 1.423 | 2 | 1.2 | 2 |
| EXAMPLE 14 | 500 | 250 | 600 | 0.5 | 0.83 | 8.2 | 0.03 | 0.05 | 0.6 | 1.423 | 2 | 1.2 | 2 |
| EXAMPLE 15 | 200 | 100 | 230 | 0.5 | 0.87 | 2 | 0.007 | 0.047 | 0.15 | 1.418 | 2 | 0.5 | 2 |

In Table 1, the evaluation of the bending loss is based on the following criteria; "1" stands for the case where the bending loss was less than 0.05 dB; "2" for the case where the bending loss was not less than 0.05 dB and not more than 0.08 dB; "3" for the case where the bending loss was over 0.08 dB; "unmeasurable" for the case where the bending loss was unable to be measured.

($d_2$) was decreased, and the transmission bandwidth and bending loss were measured for this optical fiber in the same manner as in Example 1. As apparent from the results shown in Table 1, the transmission bandwidth was smaller than that of the optical fiber of Example 1 but was still sufficiently wide. The bending loss was nearly equal to that of the optical fiber of Example 1.

(Example 3)

An optical fiber was produced in the same manner as in Example 1 except that the core diameter of the inner core 1 ($d_2$) was decreased, and the transmission bandwidth and bending loss were measured for this optical fiber in the same manner as in Example 1. As apparent from the results shown in Table 1, the transmission bandwidth was smaller than that of the optical fiber of Example 1 but larger than that of the optical fiber of Example 2, and was still sufficiently wide. The bending loss was nearly equal to that of the optical fiber of Example 1.

(Example 4)

An optical fiber was produced in the same manner as in Example 1 except that the core diameter of the inner core 1 ($d_2$) was increased, and the transmission bandwidth and bending loss were measured for this optical fiber in the same manner as in Example 1. As apparent from the results shown in Table 1, the transmission bandwidth was considerably greater than that of the optical fiber of Example 1 and was over 2 GHz·100 m. The bending loss was nearly equal to that of the optical fiber of Example 1.

(Example 5)

An optical fiber was produced in the same manner as in Example 1 except that the cladding was made of a mixture (the refractive index 1.418) of the compounds (1)–(5) in Example 1 in the following composition (weight ratio):

(1):(2):(3):(4):(5)=10:60:10:15:5 and that $\Delta n_2$ was decreased, and the transmission bandwidth and bending loss were measured for this optical fiber in the same manner as in Example 1. As apparent from the results shown in Table 1, the transmission bandwidth was smaller than that of the optical fiber of Example 1 but was still sufficiently wide. The bending loss was nearly equal to that of the optical fiber of Example 1.

(Example 6)

An optical fiber was produced in the same manner as in Example 1 except that the cladding was made of a mixture (the refractive index 1.438) of the compounds (1)–(5) in Example 1 in the following composition (weight ratio)

(1):(2):(3):(4):(5)=10:40:15:30:5 and that $\Delta n_2$ was increased, and the transmission bandwidth and bending loss were measured for this optical fiber in the same manner as in Example 1. As apparent from the results shown in Table 1, the transmission bandwidth was a little larger than that of the optical fiber of Example 1. The bending loss was nearly equal to that of the optical fiber of Example 1.

(Example 7)

An optical fiber was produced in the same manner as in Example 1 except that the cladding was made of a mixture (the refractive index 1.394) of the compounds (1)–(5) in Example 1 in the following composition (weight ratio)

(1):(2):(3):(4):(5)=10:75:5:5:5, that $\Delta n_2$ was decreased, and that $\Delta n_{total}$ was increased, and the transmission bandwidth and bending loss were measured for this optical fiber in the same manner as in Example 1. As apparent from the results shown in Table 1, the transmission bandwidth was smaller than that of the optical fiber of Example 1 but was still sufficiently wide. The bending loss was good as being less than that of the optical fiber of Example 1.

(Example 8)

An optical fiber was produced in the same manner as in Example 1 except that the refractive index profile of the inner core 1 was a 1.5th power profile ($\alpha=1.5$), and the transmission bandwidth and bending loss were measured for this optical fiber in the same manner as in Example 1. As apparent from the results shown in Table 1, the transmission bandwidth was smaller than that of the optical fiber of Example 1 but was still sufficiently wide. The bending loss was nearly equal to that of the optical fiber of Example 1.

(Example 9)

An optical fiber was produced in the same manner as in Example 1 except that the refractive index profile of the inner core 1 was a third power profile ($\alpha=3$), and the transmission bandwidth and bending loss were measured for this optical fiber in the same manner as in Example 1. As apparent from the results shown in Table 1, the transmission bandwidth was smaller than that of the optical fiber of Example 1 but was still sufficiently wide. The bending loss was nearly equal to that of the optical fiber of Example 1.

(Example 10)

An optical fiber was produced in the same manner as in Example 1 except that the refractive index profile of the inner core 1 was a fifth power profile ($\alpha=5$), and the transmission bandwidth and bending loss were measured for this optical fiber in the same manner as in Example 1. As apparent from the results shown in Table 1, the transmission bandwidth was smaller than that of the optical fiber of Example 1 but was still sufficiently wide. The bending loss was nearly equal to that of the optical fiber of Example 1.

(Example 11)

An optical fiber was produced in the same manner as in Example 1 except that the outside diameter of the cladding 3 was decreased, and the transmission bandwidth and bending loss were measured for this optical fiber in the same manner as in Example 1. As apparent from the results shown in Table 1, the transmission bandwidth and bending loss were both nearly equal to those of the optical fiber of Example 1.

(Example 12)

An optical fiber was produced in the same manner as in Example 1 except that the outside diameter of the cladding 3 was increased, and the transmission bandwidth and bending loss were measured for this optical fiber in the same manner as in Example 1. As apparent from the results shown in Table 1, the transmission bandwidth and bending loss were both nearly equal to those of the optical fiber of Example 1.

(Example 13)

An optical fiber was produced in the same manner as in Example 1 except that $d_1$, $d_2$, and $d_{clad}$ were decreased, and the transmission bandwidth and bending loss were measured for this optical fiber in the same manner as in Example 1. As apparent from the results shown in Table 1, the transmission bandwidth and bending loss were both nearly equal to those of the optical fiber of Example 1.

(Example 14)

An optical fiber was produced in the same manner as in Example 1 except that $d_1$, $d_2$, and $d_{clad}$ were increased, and the transmission bandwidth and bending loss were measured for this optical fiber in the same manner as in Example 1. As apparent from the results shown in Table 1, the transmission bandwidth and bending loss were both nearly equal to those of the optical fiber of Example 1.

(Example 15)

An optical fiber was produced in the same manner as in Example 5 except that $\Delta n_2$ and $\Delta n_{total}$ were decreased, and the transmission bandwidth and bending loss were measured for this optical fiber in the same manner as in Example 1. As apparent from the results shown in Table 1, the bandwidth was a little narrower than that of the optical fiber of Example 5, but was still sufficiently wide. The bending loss was nearly equal to that of the optical fiber of Example 1.

(Comparative Example 1)

An optical fiber was produced so as to have the cladding (the refractive index 1.408) made of a mixture of the compounds (1)–(5) in Example 1 in the following composition (weight ratio):

(1):(2):(3):(4):(5)=10:68:5:12:5;

and the core (the refractive index 1.423) in which the refractive index profile of the step index type was formed, made of a mixture of the compounds (1)–(5) in Example 1 in the following composition (weight ratio):

(1):(2):(3):(4):(5)=10:52:15:18:5, and the transmission bandwidth and bending loss were measured for this optical fiber in the same manner as in Example 1. The results were shown in Table 2.

TABLE 2

|  | $d_1$ ($\mu$m) | $d_2$ ($\mu$m) | $d_{clad}$ ($\mu$m) | $d_2/d_1$ | $d_1/d_{clad}$ | DOPING AMOUNT OF Ge (wt %) | $\Delta n_2$ | $\Delta n_{total}$ | $\Delta n_2/\Delta n_{total}$ | $n_{clad}$ |
|---|---|---|---|---|---|---|---|---|---|---|
| COMPARATIVE EXAMPLE 1 | 200 |  | 230 | 0 | 0.87 | 0 | 0 | 0.05 | 0 | 1.408 |
| COMPARATIVE EXAMPLE 2 | 200 | 200 | 230 | 1 | 0.87 | 16.4 | 0.015 | 0.015 | 1 | 1.502 |
| COMPARATIVE EXAMPLE 3 | 200 | 200 | 230 | 1 | 0.87 | 33 | 0.03 | 0.03 | 1 | 1.502 |
| COMPARATIVE EXAMPLE 4 | 200 | 100 | 230 | 0.5 | 0.87 | 8.2 | 0.015 | 0.03 | 0.5 | 1.453 |
| COMPARATIVE EXAMPLE 5 | 90 | 45 | 120 | 0.5 | 0.75 | 8.2 | 0.03 | 0.05 | 0.6 | 1.423 |
| COMPARATIVE EXAMPLE 6 | 600 | 300 | 630 | 0.5 | 0.95 | 8.2 | 0.030 | 0.05 | 0.6 | 1.423 |

|  | OUTER CORE | INNER CORE | CLADDING | $\alpha$ (POWER) | BANDWIDTH (GH$_z$ · 100 m) | BENDING LOSS |
|---|---|---|---|---|---|---|
| COMPARATIVE EXAMPLE 1 | SILICA | — | PLASTIC | 0 | 0.15 | 2 |
| COMPARATIVE EXAMPLE 2 | SILICA | — | PLASTIC | 2 | >2 | 3 |
| COMPARATIVE EXAMPLE 3 | SILICA | — | PLASTIC | 2 | >2 | 3 |
| COMPARATIVE EXAMPLE 4 | SILICA | SILICA | PLASTIC | 2 | 2 | 3 |
| COMPARATIVE EXAMPLE 5 | SILICA | SILICA | PLASTIC | 2 | UNMEASURABLE | UNMEASURABLE |
| COMPARATIVE EXAMPLE 6 | SILICA | SILICA | PLASTIC | 2 | 1.2 | UNMEASURABLE |

As shown in Table 2, the bending loss was nearly equal to that of Example 1, but the transmission bandwidth was considerably smaller than that of the optical fiber of Example 1.

(Comparative Example 2)

An optical fiber was produced so as to have the cladding (the refractive index 1.502) made of a mixture of the compounds (1)–(5) in Example 1 in the following composition (weight ratio):

(1):(2):(3):(4):(5)=0:0:25:70:5;

and the core in which Ge (the doping amount: 8.2 wt %) was distributed throughout the whole diameter in silica glass having the refractive index of 1.502, and the transmission bandwidth and bending loss were measured for this optical fiber in the same manner as in Example 1. The results were shown in Table 2. As shown in Table 2, the transmission bandwidth was over 2 GHz·100 m, sufficiently greater than that of the optical fiber of Example 1, but the bending loss was not sufficient, considerably larger than that of the optical fiber of Example 1. Since Ge was distributed throughout the whole core, the production cost was higher than that of the optical fiber of Example 1.

(Comparative Example 3)

An optical fiber was produced in the same manner as in Comparative Example 2 except that $\Delta n_2$ and $\Delta n_{total}$ were increased, and the transmission bandwidth and bending loss were measured for this optical fiber in the same manner as in Example 1. The results were shown in Table 2. As shown in Table 2, the transmission bandwidth was over 2 GHz·100 m, sufficiently greater than that of the optical fiber of Example 1, but the bending loss was considerably larger than that of the optical fiber of Example 1 and thus not sufficient. Since Ge was distributed throughout the whole core, the production cost was higher than that of the optical fiber of Example 1.

(Comparative Example 4)

An optical fiber was produced in the same manner as in Example 1 except that $\Delta n_2$ and $\Delta n_{total}$ were decreased and that the cladding was made of silica glass of the refractive index 1.453, and the transmission bandwidth and bending loss were measured for this optical fiber in the same manner as in Example 1. The results were shown in Table 2. As shown in Table 2, the transmission bandwidth was greater than that of the optical fiber of Example 1, but the bending loss was greater than that of the optical fiber of Example 1 and not sufficient.

(Comparative Example 5)

An optical fiber was produced in the same manner as in Example 1 except that $d_1$ and $d_2$ were decreased, and the transmission bandwidth and bending loss were measured for this optical fiber in the same manner as in Example 1. The results were shown in Table 2. As shown in Table 2, neither the transmission bandwidth nor the bending loss was able to be measured, because the intensity of emitted light was not stable.

(Comparative Example 6)

An optical fiber was produced in the same manner as in Example 1 except that $d_1$ and $d_2$ were increased, and the transmission bandwidth and bending loss were measured for this optical fiber in the same manner as in Example 1. The results were shown in Table 2. As shown in Table 2, the transmission bandwidth was nearly equal to that of the optical fiber of Example 1, but the bending loss was unable to be measured, because the optical fiber was broken when bent.

As detailed above, the present invention makes it easier in the case where the outer core has a large diameter, to precisely control the refractive index profile of the inner core and in turn to form the desired index profile in the inner core, than in the case where the refractive index profile is formed with increasing refractive indices toward the center axis across the whole core diameter. This increases the productivity of optical fiber. Since the cladding contains the plastic material, the total refractive index difference ($\Delta n_{total}$) can be set large, whereby the optical coupling efficiency can be increased between the optical fiber and the light source to be coupled therewith and whereby the bending loss of optical fiber can be decreased.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber comprising:

an inner core having a refractive index profile in which refractive indices increase toward the center axis thereof;

an outer core provided outside of said inner core and having a constant refractive index not more than the minimum refractive index of said inner core; and a cladding provided outside of said outer core and having a refractive index smaller than said constant refractive index of said outer core;

wherein total refractive index difference ($\Delta n_{total}$), defined as the difference between the maximum refractive index of said inner core and the refractive index of said cladding, is not less than 0.015 and not more than 0.1; and a outside core diameter ($d_1$) of said outer core is not less than 100 µm and not more than 500 µm.

2. The optical fiber according to claim 1, wherein the ratio ($d_2/d_1$) of the core diameter of the inner core ($d_2$) to the outside core diameter of the outer core ($d_1$) is not less than 0.3 and not more than 0.95 and the ratio ($\Delta n_2/\Delta n_{total}$) is not less than 0.2 and not more than 0.9, $\Delta n_2$ being defined as the difference between the maximum refractive index and the minimum refractive index in said inner core.

3. The optical fiber according to claim 1, wherein the refractive index profile in said inner core is an αth power profile, where α has a value of not less than 1.5 and not more than 5.

4. The optical fiber according to claim 1, wherein the ratio ($d_1/d_{clad}$) of the core diameter of said outer core ($d_1$) to the outside diameter of said cladding ($d_{clad}$) is not less than 0.8 and not more than 0.95.

5. The optical fiber according to claim 1, wherein said inner core and said outer core contain silica glass.

* * * * *